United States Patent
Pirahanchi et al.

(10) Patent No.: US 12,311,619 B2
(45) Date of Patent: May 27, 2025

(54) MOLDING APPARATUS WITH COMBINED CORE PLUNGER/EJECTOR AND METHODS THEREFOR

(71) Applicant: Arris Composites Inc., Berkeley, CA (US)

(72) Inventors: Sam Pirahanchi, Novato, CA (US); Erick Davidson, Piedmont, CA (US)

(73) Assignee: Arris Composites Inc., Berkeley, CA (US)

( * ) Notice: Subject to any disclaimer, the term of this patent is extended or adjusted under 35 U.S.C. 154(b) by 182 days.

(21) Appl. No.: 17/975,983

(22) Filed: Oct. 28, 2022

(65) Prior Publication Data

US 2023/0140739 A1     May 4, 2023

Related U.S. Application Data

(60) Provisional application No. 63/272,777, filed on Oct. 28, 2021.

(51) Int. Cl.
    *B29C 70/54*     (2006.01)
    *B29C 70/48*     (2006.01)

(52) U.S. Cl.
    CPC ............. *B29C 70/54* (2013.01); *B29C 70/48* (2013.01)

(58) Field of Classification Search
    CPC ............ B29C 43/50; B29C 2043/5007; B29C 2043/503; B29C 70/54; B29C 45/40; B29C 45/4005; B29C 45/401
    See application file for complete search history.

(56) References Cited

FOREIGN PATENT DOCUMENTS

KR     20050017224 A   *   2/2005  ............. B29C 45/40

OTHER PUBLICATIONS

KR_20050017224_A—Machine Translation (Year: 2005).*
Consolidate Definition & Meaning _ Dictionary.com_10102024 (Year: 2024).*

* cited by examiner

*Primary Examiner* — Yunju Kim
(74) *Attorney, Agent, or Firm* — Kaplan Breyer Schwarz, LLP

(57) ABSTRACT

A molding apparatus for injection molding or compression molding includes an "A" portion of a mold, a "B" portion of the mold, and at least one core plunger/ejector. The core plunger/ejector provides dual functionality, wherein it participates in molding operations by consolidating a feed material in the mold cavity, and also is responsible for separating the part from various mold surfaces and ejecting it from the mold.

15 Claims, 6 Drawing Sheets

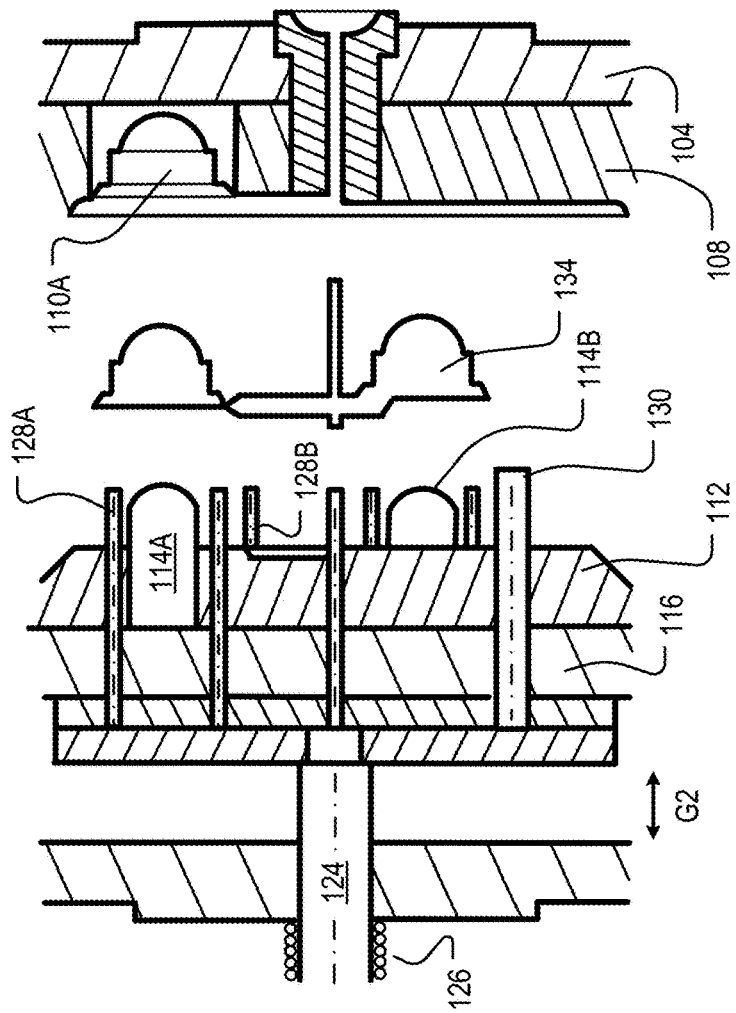
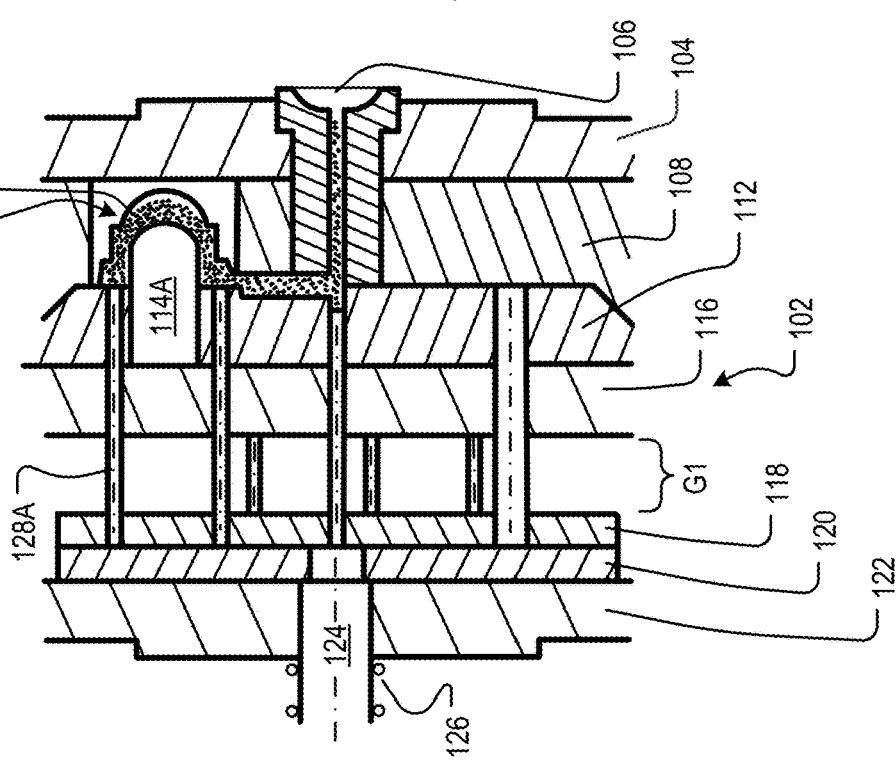

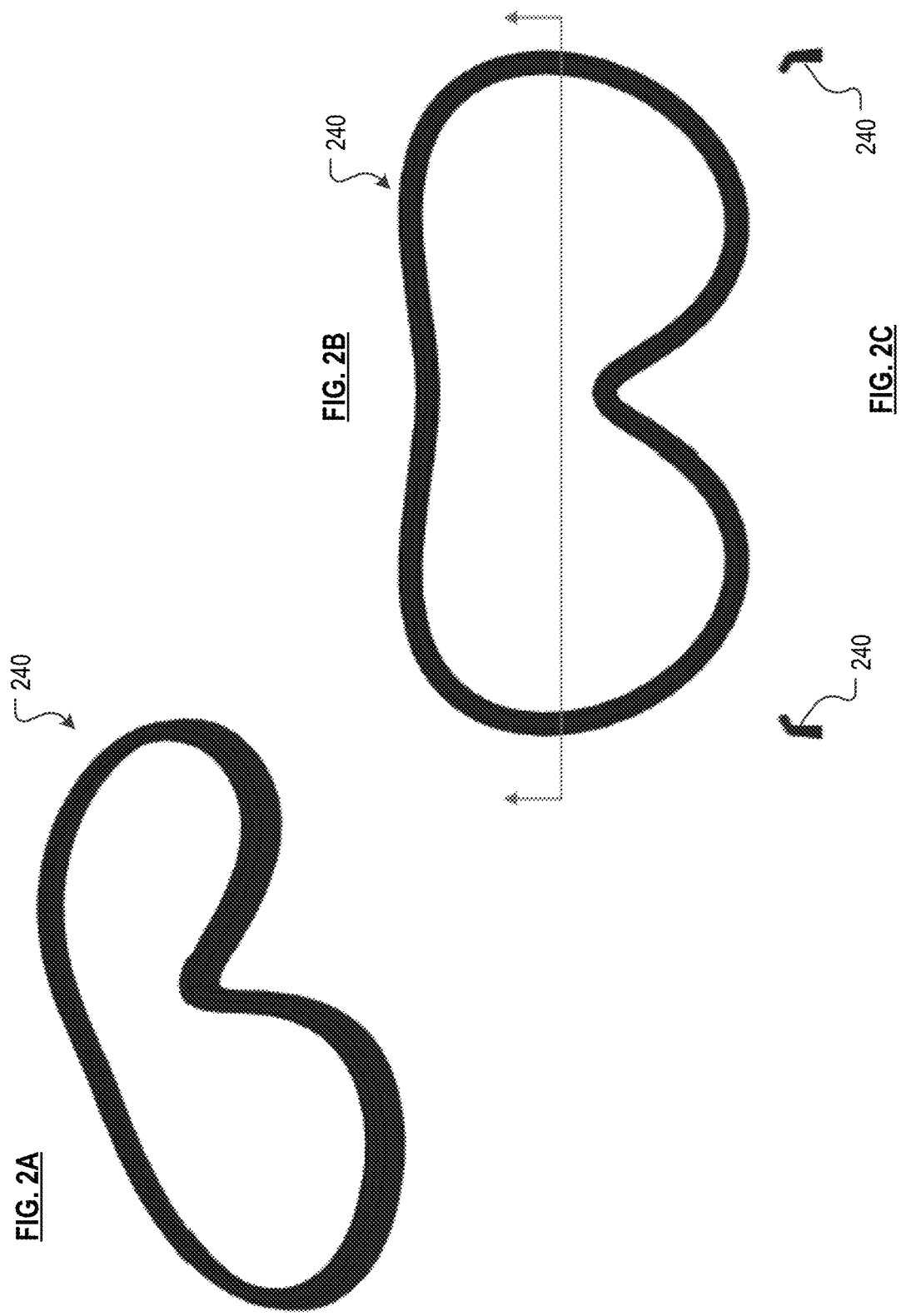

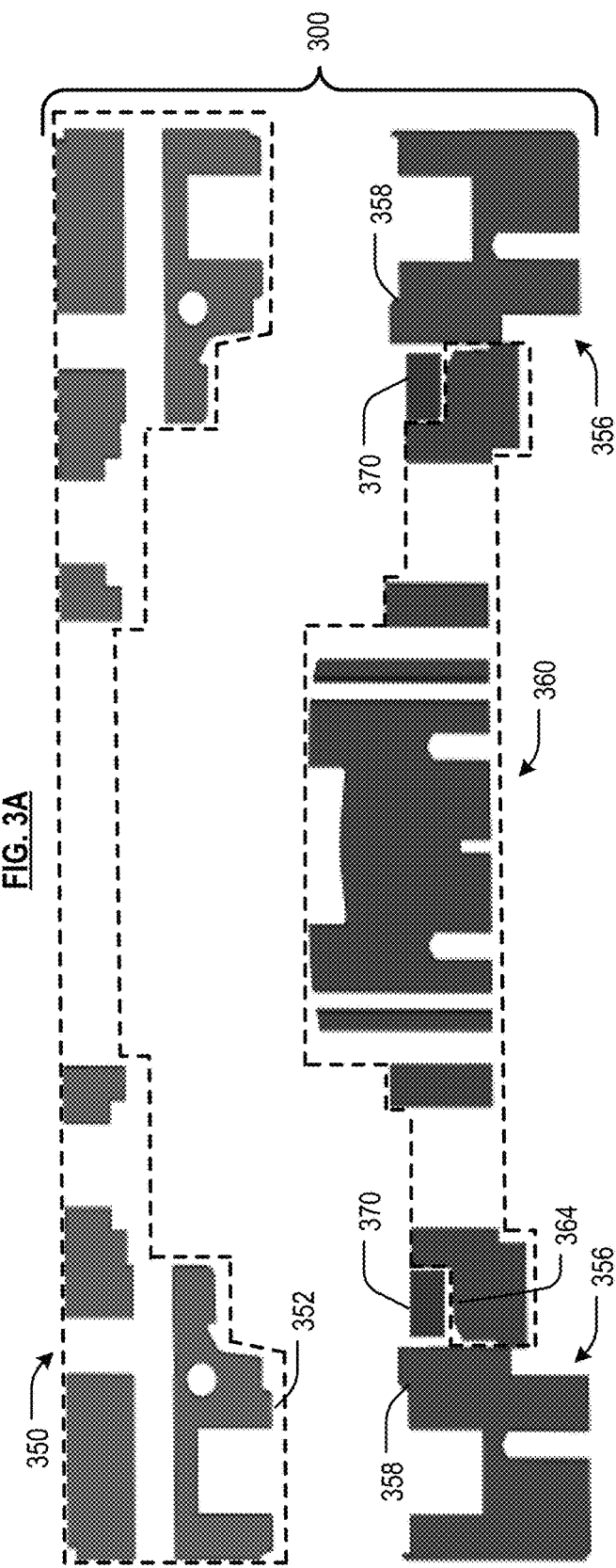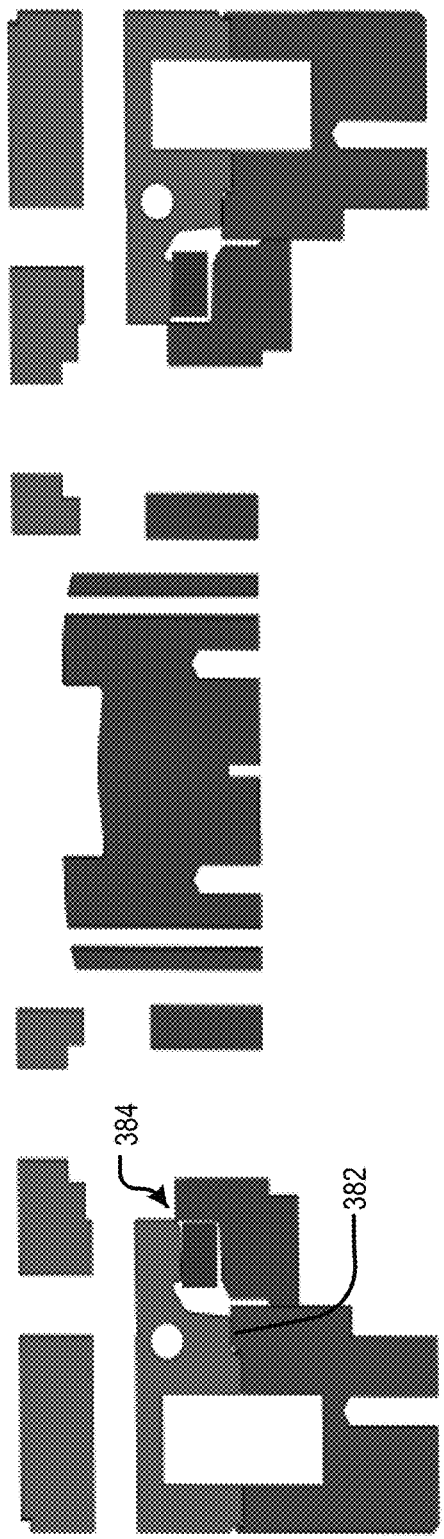

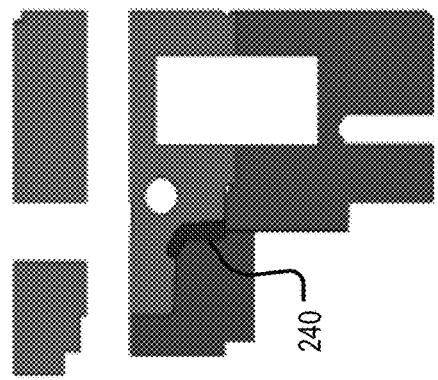
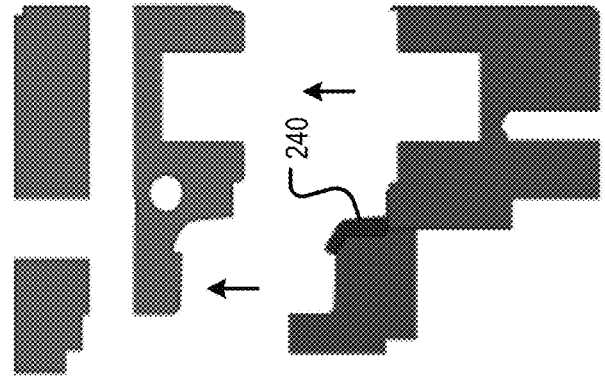
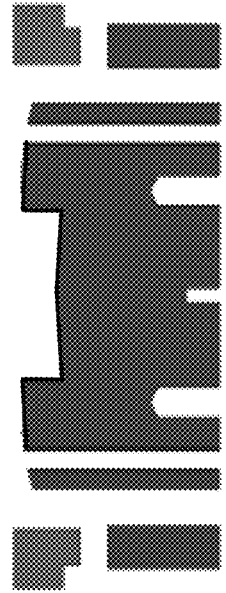
FIG. 3C
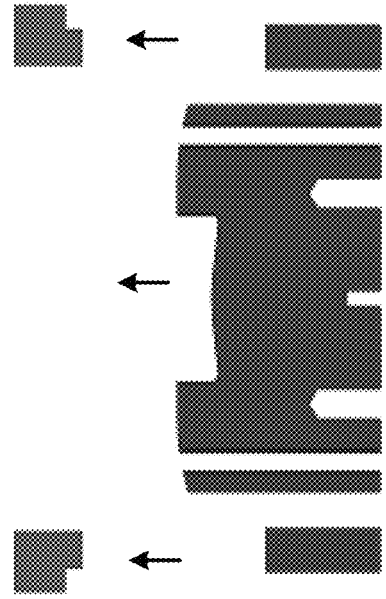
FIG. 3D
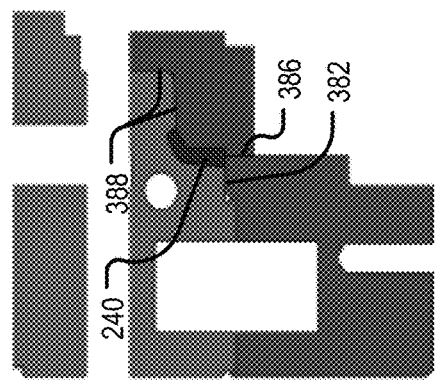
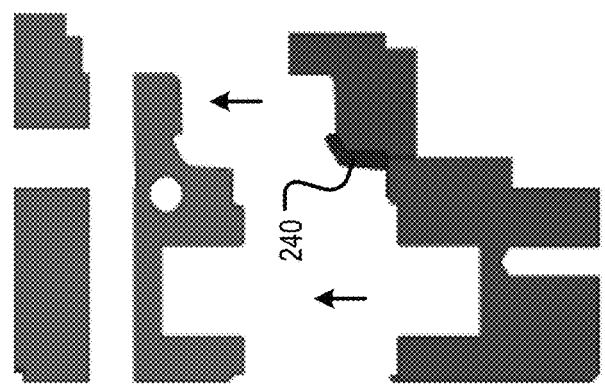

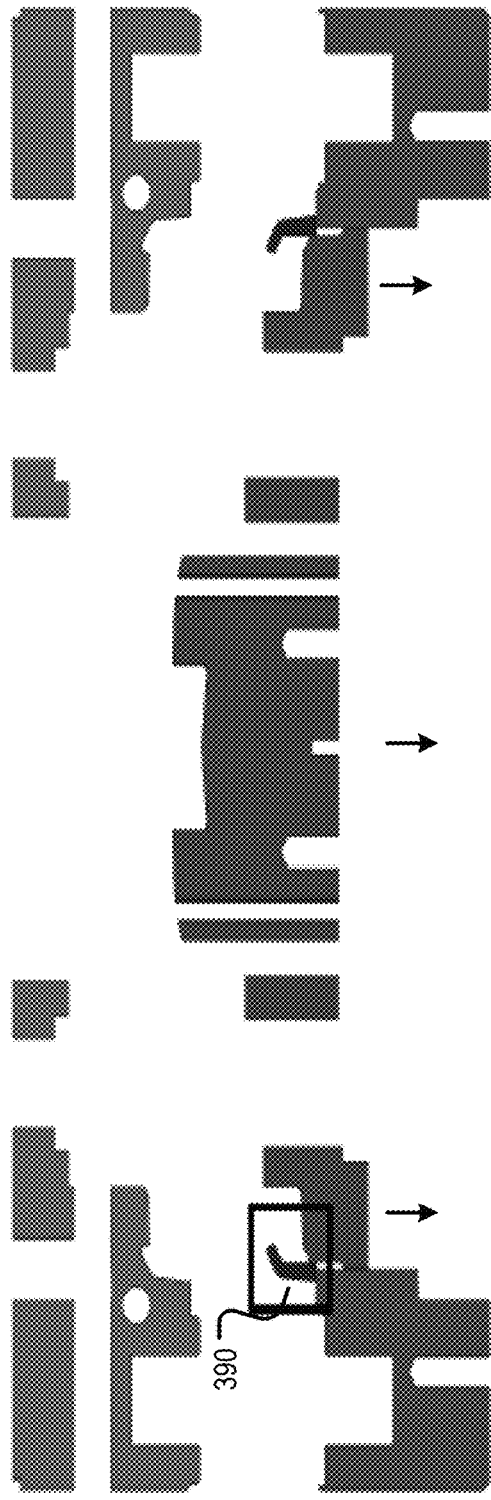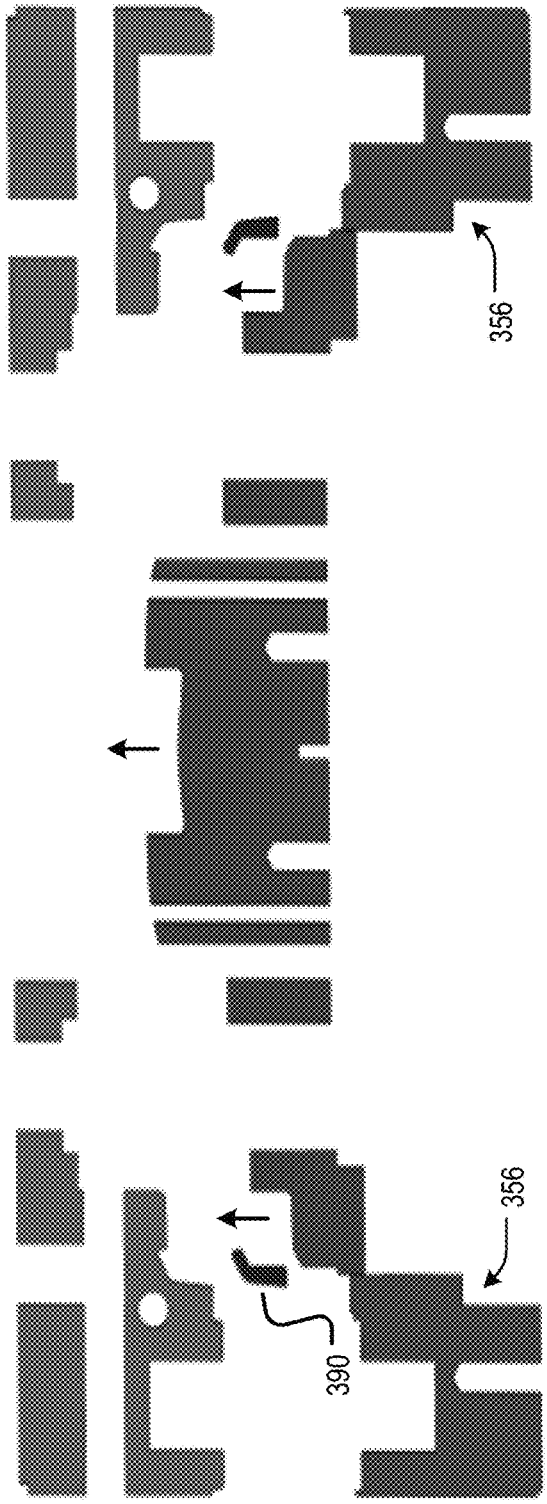

MOLDING APPARATUS WITH COMBINED CORE PLUNGER/EJECTOR AND METHODS THEREFOR

FIELD OF THE INVENTION

The present invention relates to the molding processes.

BACKGROUND

It can be problematic to fabricate plastic parts having varying cross-sections, geometries, and fine/thin features via conventional molding processes such as injection molding and compression molding. Among other issues, once such a part is formed, extreme care must be taken when ejecting the part from the mold to prevent damaging the part. To make such parts, molding apparatuses typically include relatively complex, integrated ejection systems, which may include ejector pins, ejector blades, and/or stripper plates. These systems, which are arranged in a part-specific layout, support a part at various locations when the time comes to eject the part from a mold.

FIGS. 1A and 1B depict, via cross sectional views, portions of a conventional injection-molding system 100, including integrated ejection system 102. The ejection system depicted uses ejector pins for the removal of a finished part. FIG. 1A depicts system 100 during molding operations to form a part, and FIG. 1B shows the system after the part has been molded, and removed from the mold via the ejection system.

Injection molding system 100 includes top clamping plate 104, sprue 106, cavity plate 108, cavity 110A, core plate 112, core 114A/B, core support plate 116, ejector retaining plate 118, ejector plate 120, bottom clamping plate 122, ejector bar 124, spring 126, three ejector pins 128A (fully visible in FIGS. 1A/B), three ejector pins 128B (partially obscured in FIGS. 1A/B), and return pin 130. Ejection system 102 includes ejector retaining plate 118, ejector plate 120, ejector bar 124, spring 126, ejector pins 128A, ejector pins 128B, and return pin 130.

FIG. 1A depicts liquified molding material 132 (resin, or resin and fiber) in cavity 110A (see, FIG. 1B). It is injected under pressure through sprue 106. Core (or plunger) 114A protrudes into cavity 110A, and these two elements are responsible for one of the resulting (hollow) domed portions of finished part 134 (see FIG. 1B). Molding system 100 also includes a second core 114B/cavity pairing, which is responsible for forming the second domed portion of finished part 134. (The cavity that pairs with second core 114B is obscured in FIGS. 1A and 1B.)

In FIG. 1A, ejection system 102 is in an unactuated state, wherein ejector pins 128A and 128B are positioned "below" the bottom surface of nascent part 134. The ends of (the three) pins 128A and (the three) pins 128B, which will support various regions of the finished part, are flush with the top surface of core plate 112. In this unactuated state, ejector retaining plate 118 and catch plate 116 are separated by gap G1, and spring 126 is in an uncompressed state.

In FIG. 1B, part 134 has been formed, and the upper portion of molding system 100, including cavity plate 108, top clamping plate 104, and sprue 106, has been separated from the lower portion of the molding system to facilitate the part's removal. Ejection system 102 has been actuated to remove part 134. When actuated, ejector bar 124 is advanced by a distance G2, and spring 124 is compressed. The ejector bar drives ejector plate 120 and ejector retaining plate 118 forward, advancing ejector pins 128A and 128B. Ultimately, gap G1 between ejector retaining plate 118 and catch plate 116 fully collapses. As the ejector pins move proud of core plate 112, they contact the base of part 134, thereby forcing the part away from core plate 112 and ejecting the part.

Ejector pins 128A and 128B must be situated to provide sufficient support to part 134 by appropriately distributing the load applied thereto. Doing so ameliorates deformation of the part, thereby preventing damage to part 134 during the ejection process.

A number of drawbacks are associated with the presence of prior-art ejection system 102. Among any other drawbacks, the ejection system:

increases the parts count of the molding system, resulting in increased capital cost;

complicates assembly/disassembly of the molding system, increasing overall molding time and labor cost;

increases the presence of flash near a part's ejection surface as the ejector pins wear, resulting in substantial post processing of a finished part, and increasing overall molding time and labor cost;

only suitable for supporting a non-cosmetic surface of a part (due to marring caused by the pins);

creates a large number of failure modes;

requires frequent parts replacement as the ejector pins buckle, such as when the force required to eject the part from the core exceeds the strength of the pin; and from galling (metal-on-metal wear as an off-center ejector pin moves through holes in various plates during actuation of the ejection system); and decreases the interchangeability of mold components and parts.

Many of the same drawbacks are associated with ejection systems using ejector blades, and stripper plates/rings. Although the ejection system discussed above was used in conjunction with an injection-molding system, ejection systems for use in conjunction with other types of molding apparatus, such as a compression molding system, are similar in design and operation, and have all the same drawbacks.

SUMMARY

Some embodiments of the invention provide a means and a method for ejecting parts from a molding apparatus that avoid many of the costs and disadvantages of the prior art.

In accordance with an illustrative embodiment, a one-piece mold component—a core plunger/ejector—replaces the multi-piece ejection systems of the prior art. In addition to providing part-ejection functionality, the core plunger/ejector of the present invention also participates in molding operations. For example, in some embodiments, the core plunger/ejector is used to consolidate the feed material in the mold cavity, compacting it to its final form. This is unlike the ejection systems of the prior art, wherein the pins, etc., do not in any way participate in the actual molding (consolidation) of the resin or resin/fiber feed into the final form of a part.

In some embodiments, the core plunger/ejector is integrated into compression-molding systems to provide improved variants of such processes. Thus, a molding apparatus for injection molding or compression molding in accordance with the present teachings nominally include three main elements: an "A" portion of a mold, a "B" portion of the mold, and the core plunger/ejector.

It is notable that a conventional compression mold has two main elements: a top, typically male-mold half (sometimes called the "A" portion of the mold) and a bottom, typically female-mold half (sometimes called the "B" portion of the mold). In such a conventional compression mold, the A portion functions as a "plunger" to press down and consolidate feed material (i.e., resin and fiber) that resides in a cavity in the B portion. To provide part-ejection functionality, a conventional mold includes a plurality of minor elements, such as pins and an accompanying actuation system, as previously discussed (see, e.g., FIGS. 1A, 1B for an injection molding system).

In accordance with some embodiments, and in contrast to conventional compression molding, the A and B portions of the mold function collaboratively to create a cavity, wherein it is the core plunger/ejector compacts the feed material and seals the cavity. In some embodiments, more than one core plunger/ejector is used in conjunction with a single mold cavity.

Embodiments of the invention provide substantial benefits compared to the prior art. These include, among any others, a substantial reduction in: (i) molding apparatus complexity, (ii) mold part count, (iii) maintenance and repair, (iv) failure modes, and (v) flash, and a substantial improvement in interchangeability.

In some embodiments, the invention provides a molding apparatus having an A-portion; a B-portion, and a core plunger/ejector. At least one of the A-portion or the B-portion is movable to open and close the molding apparatus, and the core plunger/ejector is movable to (a) consolidate a charge into a geometry of the part; and (b) eject a molded part from the molding apparatus.

In some other embodiments, the invention provides a method for molding comprising: advancing a core plunger/ejector of a molding apparatus to consolidate a charge in a cavity to a shape of the part; cooling the molding apparatus to form the part; opening the molding apparatus; moving the core plunger/ejector to break a bond between the part and the core plunger/ejector; and moving the core plunger/ejector to break a bond between the part and an A-portion or a B-portion of the molding apparatus.

Summarizing, a molding apparatus, as depicted and described, comprises: (i) an A-portion of a mold, (ii) a B-portion of a mold, and a core plunger/ejector. Embodiments of the molding apparatus may further comprise at least one of the following features, in any (non-conflicting) combination, among other features disclosed herein:

the core plunger/ejector is movable to form a sealed cavity, in conjunction with the A-portion and the B-portion, in which a charge is received.

the core plunger/ejector is movable to consolidate the charge in the cavity to a shape of the part.

the core plunger/ejector is movable to break a bond formed between the finished part and the core plunger/ejector.

the core plunger/ejector is movable to break a bond formed between the part and at least one of the A-portion or the B-portion of the mold.

the core plunger/ejector advances to form the sealed cavity.

the core plunger/ejector advances to consolidate the charge.

the core plunger/ejector retracts to break the bond between the part and the core plunger/ejector.

the core plunger/ejector advances to break the bond between the part and at least one of the A-portion or the B-portion of the molding apparatus.

the molding apparatus is a compression molding apparatus.

the molding apparatus in an injection molding apparatus.

the molding apparatus includes more than one core plunger/ejector.

the core plunger/ejector is symmetric about a vertical center line.

the core plunger/ejector is asymmetric about a vertical center line.

the core plunger/ejector actuates in the z direction.

other than the core plunger/ejector, the molding apparatus does not include ejector pins or any other structure that is used to separate/eject a finished part from any surface (e.g., a surface of the A-portion, a surface of the B-portion, etc.) of the molding apparatus.

BRIEF DESCRIPTION OF THE DRAWINGS

FIG. 1A depicts a conventional injection-molding system, including an ejection system, wherein the ejection system is in an unactuated state.

FIG. 1B depicts the conventional injection-molding system of FIG. 1A, wherein the ejection system is fully actuated thereby removing a finished part from the mold.

FIGS. 2A-2C depict a part that is to be made using a compression molding apparatus that includes a core plunger/ejector in accordance with an illustrative embodiment of the present invention.

FIGS. 3A-3F depict, via a sectional view of, a sequence of operations for making the part of FIGS. 2A-2C using a compression molding apparatus including a core plunger/ejector.

DETAILED DESCRIPTION

Figure 4:
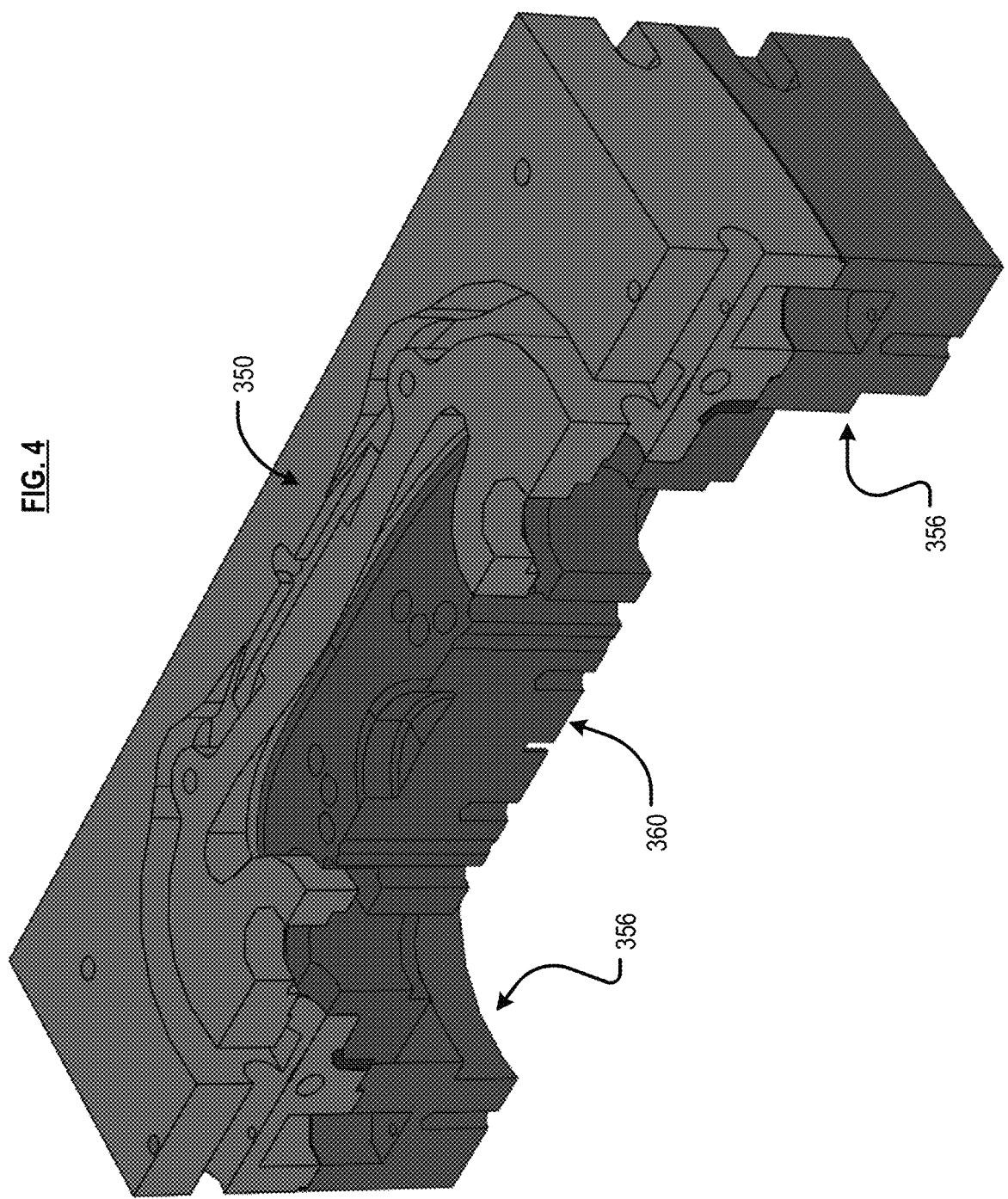
FIG. 4 depicts a perspective view of a portion of the compression molding apparatus depicted in FIGS. 3A-3F.

FIGS. 2A-2C depict a part—a frame for ski goggles—that is made by an improved compression-molding apparatus that includes a core plunger/ejector, in accordance with an illustrative embodiment of the invention.

FIG. 2A depicts a perspective view of frame 240 for the ski googles. FIG. 2B depicts a front view of frame 240, and FIG. 2C depicts a sectional view of frame 240 through the line A-A in FIG. 2B and in the direction shown.

FIGS. 3A through 3F depict a molding sequence for forming frame 240 of FIGS. 2A through 2C, as illustrated by the relative positions of the three major portions of compression-molding apparatus 300. The portions of apparatus 300 are shown via sectional views for clarity. FIG. 4 depicts a perspective view of compression-molding apparatus 300 (to supplement the sectional views depicted in FIGS. 3A-3F), wherein the configuration of apparatus 300 depicted in FIG. 4 (as a function of depicted progress of the molding sequence) corresponds to FIG. 3C.

FIG. 3A depicts a sectional view of compression-molding apparatus 300. Apparatus 300 includes "A" portion 350 (identified within dashed lines), "B" portion 356, and core plunger/ejector 360 (identified within dashed lines). Other elements of apparatus 300, such as an actuator to move core plunger/ejector 360 "upwards" or "downwards," are not depicted in the figures to maintain a focus on elements that are most germane to an understanding of the invention. These three portions—A portion 350, B portion 356, and core plunger/ejector 360—are depicted in perspective in FIG. 4. The various unidentified channels and openings that appear in FIG. 4, which for the most part do not appear in FIGS. 3A-3F, are for purposes of tool machinability or mold operability. As to the latter, such channels and openings are used for thermocouple placement, as a heater-cartridge housing, for mold assembly, for mold fixation to a press, etc. These channels and openings are not germane to an understanding of the invention and, consequently, will not be described in further detail.

In FIG. 3A, compression-molding apparatus 300 is "open," such that A-portion 350 and B-portion 356 are separated from one another. In this state, core plunger/ejector 360 is in a retracted state. Charge 370 of resin or resin/fiber has been placed on surface 364 of core plunger/ejector 360.

FIG. 3B depicts molding apparatus 300 with the cavity in a sealed state (although the mold itself is not necessarily closed), wherein surface 352 of A-portion 350 and surface 358 of B-portion 356 abut one another, forming parting line 382. Moreover, sealed cavity 384 is formed the abutment of various surfaces of A-portion 350, B-portion 356, and core plunger/ejector 360 with one another. Charge 370 is within sealed cavity 384. After the mold is closed, A-portion 350, B-portion 356, and core plunger/ejector 360 are heated to the processing temperature, which causes the resin in charge 370 to melt.

In FIG. 3C, core plunger/ejector 360 is advanced (i.e., moved upwards in the figure), consolidating the charge into the final shape of frame 240. Movement of core plunger/ejector 360 to its final position creates additional tooling interfaces; namely, interface 386 between B-portion 356 and core plunger/ejector 360, and interface 388 between A-portion 350 and core plunger/ejector 360. After a dwell (e.g., typically a few minutes) at the processing temperature, mold apparatus 300 starts cooling, and cools until an ejection temperature is reached.

In FIG. 3D, mold apparatus 300 is opened. With the upward movement of A-portion 350 to open the mold, the bond between the A-portion and the finished part—frame 240 (shown in section, as in FIG. 2C)— is broken.

In FIG. 3E, core plunger/ejector 360 is retracted (i.e., moves downward in the figure), breaking the bond between the molding surface of the core plunger/ejector and the finished part (frame 240). In FIG. 3F, core plunger/ejector 360 is once again advanced, breaking the bond between the bottom surface of frame 240 and the upper surface of A-portion 356, ejecting the part.

It is notable that the aforementioned sequence of operations is permutable. For example, the operation depicted in FIG. 3E can be performed before the operation depicted in FIG. 3D.

In the embodiment of molding apparatus 300 depicted in the figures, A-portion 350, B-portion 356, and core plunger/ejector 360 are symmetric about a vertical center line. However, the overall mold is not necessarily symmetric about all axes, nor is symmetry a requirement of embodiments of the invention. Furthermore, although the illustrations in FIGS. 3A-3F depict a specific cross section for frame 240, embodiments of the invention can be used to make parts having any cross-sectional geometry, which, in fact, can even vary along the part being fabricated.

In the illustrative embodiment depicted in FIGS. 3A-3F, core plunger/ejector 360 actuates in the Z direction (the vertical direction in the figure). As the sequence shows, the core plunger/ejector operates by first consolidating the resin or resin/fiber charge to finalize part geometry, and then ejects the part after the charge is solidified to a finished part.

It will be appreciated that the continuous surface of the core plunger/ejector 360 supports a finished part for ejection in a way that ejector pins cannot. In fact, since the surface of the core plunger/ejector provides much of the surface that serves as a molding cavity, it necessarily perfectly conforms to much of the shape of the finished part. Thus, virtually all of the concerns related to ejection pins are avoided by the use of the core plunger/ejector in accordance with the present teachings.

It is to be understood that the disclosure describes a few embodiments and that many variations of the invention can easily be devised by those skilled in the art after reading this disclosure and that the scope of the present invention is to be determined by the following claims.

What is claimed:

1. A molding apparatus for molding a part, comprising:
    an A-portion of the molding apparatus;
    a B-portion of the molding apparatus, at least one of the A-portion or the B-portion is movable to open and close the molding apparatus; and
    a core plunger/ejector, wherein the core plunger/ejector is physically independent of the A-portion and the B-portion, and is movable to:
    (a) form a sealed cavity in which a charge is received, wherein a surface of core plunger/ejector, a surface of the A-portion, and a surface of the B-portion form the sealed cavity; and
    (b) apply pressure to the charge in the cavity; and wherein the core plunger/ejector is movable in a first direction to fully release the part from the core plunger/ejector, and movable in a second direction that is opposite to the first direction to fully release the part from the B-portion of the molding apparatus.

2. The molding apparatus of claim 1 wherein the core plunger/ejector is a unitary/one-piece structure.

3. The molding apparatus of claim 1 wherein the core plunger/ejector advances to apply pressure to the charge.

4. The molding apparatus of claim 1 wherein the core plunger/ejector is not attached or mechanically coupled to the A-portion or the B-portion of the molding apparatus.

5. The molding apparatus of claim 1 wherein the molding apparatus is a compression molding apparatus.

6. The molding apparatus of claim 1 wherein the molding apparatus is an injection molding apparatus.

7. A molding apparatus for molding a part, comprising:
    an upper, A-portion of the molding apparatus;
    a lower, B-portion of the molding apparatus, at least one of the A-portion or the B-portion movable to open and close the molding apparatus; and
    a core plunger/ejector, wherein the core plunger/ejector is not mechanically coupled to either the A-portion and the B-portion, and wherein the core plunger/ejector is movable to:
    (a) apply pressure to a charge in a mold cavity, wherein the applied pressure conforms the charge to a shape of the mold cavity; and
    (b) fully release the part from the core plunger/ejector and from the B-portion.

8. The molding apparatus of claim 7 wherein the core plunger/ejector is a unitary/one-piece structure.

9. A molding apparatus for molding a part, comprising:
    an upper, A-portion of the molding apparatus;
    a lower, B-portion of the molding apparatus, at least one of the A-portion or the B-portion movable to open and close the molding apparatus; and
    a core plunger/ejector, wherein the core plunger/ejector is a unitary/one-piece structure that is not mechanically coupled to either of the A-portion and the B-portion, and wherein the core plunger/ejector is movable to:
    (a) apply pressure to a charge in a mold cavity, wherein the applied pressure conforms the charge to a shape of the mold cavity, and (b) wherein the core plunger/ejector is movable to release the part from the B-portion and the core plunger/ejector.

10. The molding apparatus of claim 9 wherein the core plunger/ejector moves in opposite directions to release the part from the core plunger/ejector and to release the part from the B-portion.

11. The molding apparatus of claim 9 wherein the mold cavity is defined by a surface of the core plunger/ejector, a surface of the A-portion, and a surface of the B-portion.

12. A molding apparatus for molding a part, comprising:
   an upper, A-portion of the molding apparatus;
   a lower, B-portion of the molding apparatus, at least one of the A-portion or the B-portion movable to open and close the molding apparatus; and
   a core plunger/ejector, wherein the core plunger/ejector is a unitary/one-piece structure that is movable independently of the A-portion and B-portion to:
   (a) fully release the part from the core plunger/ejector, and
   (b) fully release the part from the B-portion.

13. The molding apparatus of claim 12 wherein the core plunger/ejector moves in opposite directions to release the part from the core plunger/ejector and to release the part from the B-portion.

14. The molding apparatus of claim 12 wherein the mold cavity is defined by a surface of the core plunger/ejector, a surface of the A-portion, and a surface of the B-portion.

15. The molding apparatus of claim 12 wherein the molding apparatus is a compression molding apparatus.

\* \* \* \* \*